United States Patent [19]
Aoyama

[11] Patent Number: 5,233,151
[45] Date of Patent: Aug. 3, 1993

[54] DEVICE FOR CONTROLLING FEED SPEED OF PARTS

[76] Inventor: Yoshitaka Aoyama, 20-11, Makitsukadai 2-cho, Sakai-shi, Osaka 590-01, Japan

[21] Appl. No.: 855,866

[22] Filed: Mar. 23, 1992

[30] Foreign Application Priority Data

Mar. 30, 1991 [JP] Japan .................... 3-142279

[51] Int. Cl.⁵ .................................... B23K 9/20
[52] U.S. Cl. ........................ 219/98; 221/266
[58] Field of Search ............ 219/98, 99; 221/266

[56] References Cited

U.S. PATENT DOCUMENTS

| 3,582,602 | 6/1971 | Ettinger et al. | 219/98 |
| 3,792,223 | 2/1974 | Spisak | 219/98 |
| 4,074,425 | 2/1978 | Hashimoto |  |
| 4,469,928 | 9/1984 | Wilkinson et al. | 219/98 |
| 5,067,632 | 1/1991 | Aubry | 221/266 |

FOREIGN PATENT DOCUMENTS

| 364225 | 10/1981 | Austria . |
| 2446137 | 6/1980 | Fed. Rep. of Germany . |
| 3528869 | 2/1987 | Fed. Rep. of Germany . |
| 3631654 | 4/1987 | Fed. Rep. of Germany . |
| 2225974 | 6/1990 | United Kingdom . |

Primary Examiner—Clifford C. Shaw
Attorney, Agent, or Firm—Pollock, VandeSande & Priddy

[57] ABSTRACT

Parts are fed at an optimum speed to a device installed at the end of a feed passage. The invention is characterized in that the basic arrangement comprises a device for once stopping a part, the device being disposed at a position separated a required distance from the parts holding device, and in that a movable shield member is installed at the side to which parts and the feed rod are advanced. Further, the arrangement is applicable to a stud welding apparatus.

3 Claims, 2 Drawing Sheets

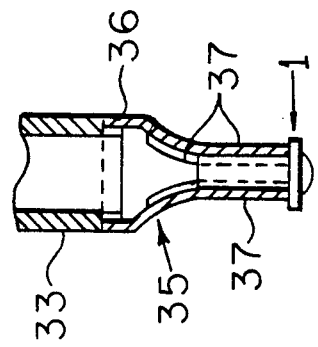
FIG. 6
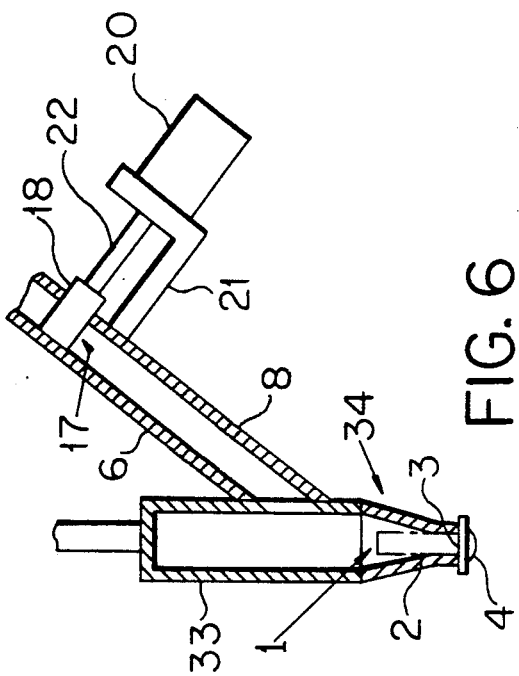
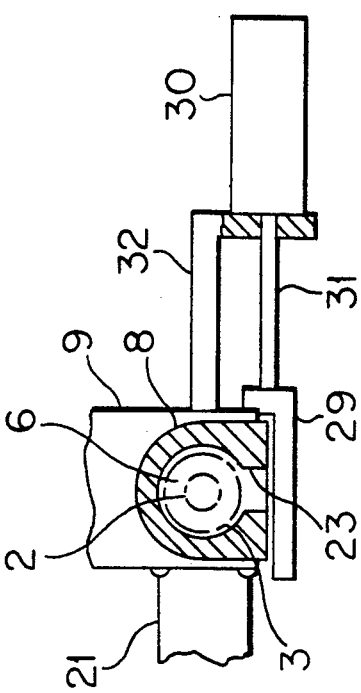
FIG. 7
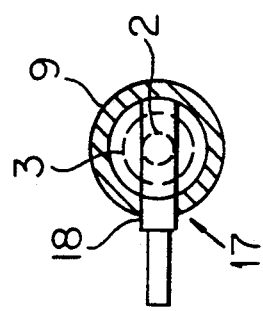
FIG. 5

DEVICE FOR CONTROLLING FEED SPEED OF PARTS

BACKGROUND OF THE INVENTION

1. Field of Industrial Applicability

This invention relates to a device for controlling the feed speed of parts and is suitable for use in handling projection bolts or stud bolts.

2. Prior Art

In device of the type in which parts holding means are installed at the end of the feed passage, parts are fed to the parts holding means via a parts feeding tube by utilizing compressed air.

According to the prior art described above, parts cannot reach the parts holding means unless the parts are started from a parts feeder at a considerably high speed. Therefore, in the case of parts holding means which is provided with a surface for supporting the welding projections of projection bolts, a number of dents are formed in the surface, interfering with the smooth slide of parts. Further, since the parts holding means of a stud welding machine is of the type having a plate spring for holding a part, the speed of a part moving to the plate spring must be within a predetermined allowable range. If not, there is a problem that such part slips through the plate spring or is unable to spread the plate spring. Further, if the parts feeding tube extending from the parts feeder to the parts holding means is long-sized, transport of parts one by one takes much time, a fact which is undesirable for improving productivity.

SUMMARY OF THE INVENTION

The present invention has been provided for solving the problems described above. The invention is a device for controlling the feed speed of parts, wherein parts holding means is installed in a feed passage, said device being characterized by including means for temporarily stopping a part at a place in the feed path separated from said parts holding means by a required distance. Thus, since a part is once stopped at a position short of the parts holding means, the speed of the part moving to said means is optimized. In the invention, the parts holding means is formed on a movable feed rod and a movable shield member is installed at the side to which parts and the feed rod are advanced. Thus, when the feed rod returns to the optimum retracted position as a part held on the feed rod is fed to an intended place, the shield member is closed to prevent the falling-off of the part or the entry of impurities. In the invention as claimed in the parts holding means is a parts holding mechanism included in a stud welding machine. Thus, the parts holding means functions normally by the controlled speed of the part based on an elasticity principle.

BRIEF DESCRIPTION OF THE DRAWINGS

FIG. 4 is a sectional view taken along the line (4)—(4) in FIG. 3,

FIG. 5 is a sectional view taken along the line (5)—(5) in FIG. 3;

FIG. 6 is a side view in longitudinal section, showing another embodiment; and

FIG. 7 is a fragmentary side view in longitudinal section.

DESCRIPTION OF THE PREFERRED EMBODIMENTS

Figure 1:
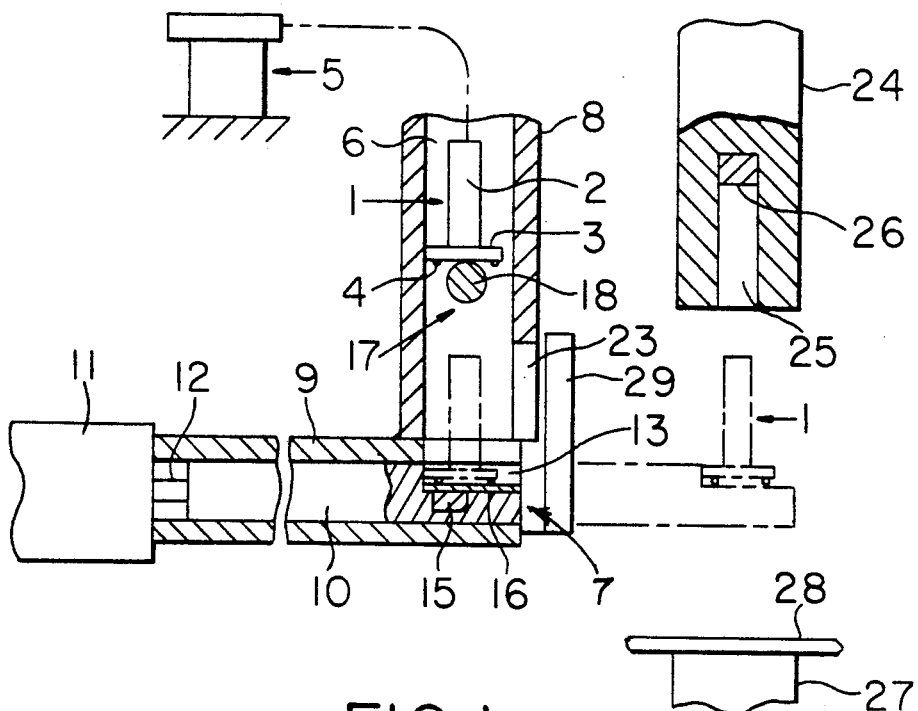
FIG. 1 is a side view in longitudinal section, showing an entire device.
Figure 2:
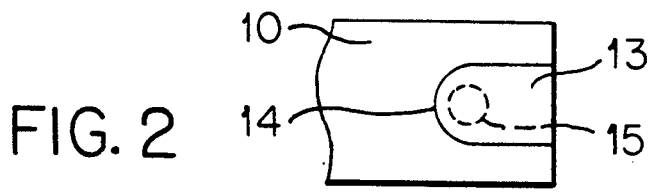
FIG. 2 is a plan view of a feed rod.

An embodiment shown in FIGS. 1 through 5 will now be described. A part 1 handled therein is a projection bolt made of iron, comprising a stem portion 2, a circular flange and projections 4 for welding. The part is fed from a parts feeder 5 via a feed passage 6 to reach parts holding means 7. The numeral 8 denotes a parts feeding tube, and a guide tube 9 is welded to the parts feed tube 8 at right angles therewith. A feed rod 10 is movably inserted in said guide tube 9 and is joined to the piston rod 12 of an air cylinder 11 attached to the end of the guide tube 9.

As for the parts holding means 7, various forms may be contemplated, but disclosed herein is a magnet type. That is, the front region of the upper surface of the feed rod 10 is formed with a recess 13 which is opened at the right and provided at the left with an arcuate portion conforming with the flange 3. A magnet (permanent magnet) 15 is embedded in the recess 13 and covered with a protective plate 16. As is clear from FIGS. 1 and 2, the magnet 15 is deviated to the arcuate portion 14. This arrangement ensures that the flange 3 conforms to the arcuate portion 14 and hence the relative positions of the part 1 and feed rod 10 are maintained constant. In order to increase the action of the magnetic force of the magnet 15 on the part 1, it is preferable that the feed rod 10, protective plate 16 and guide tube 9 be made of stainless steel, which is a nonmagnetic material. In addition, in the case where an electromagnet is used as the magnet 15, the feed rod 10 is made of iron and is extended through an exciting coil.

Figure 3:
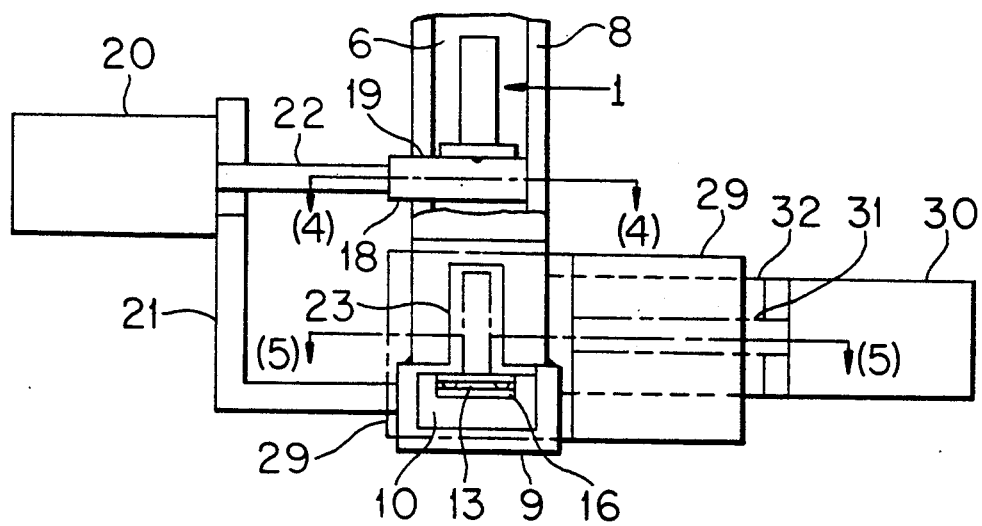
FIG. 3 is a front view of the entire device.

The means 17 for temporarily stopping a part is positioned at a place spaced a distance corresponding approximately to a single part from the parts holding means 7. As for such temporarily stopping means, various types may be contemplated, but herein shown is a control rod 18. The control rod 18 extends through a hole formed in the parts feeding tube 8 to cross the feed passage 6. By the advancing and retracting action of an air cylinder 20, the control rod closes the feed passage 6, as shown in FIGS. 3 and 4, or opens it. The air cylinder 20 is fixed to a bracket 21 welded to the guide tube 9, with its piston rod 22 joined to the control rod 18. The lower portion of the parts feeding tube 8 is formed with an elongated notch 23 to allow the stem portion 2 to pass therethrough.

This embodiment refers to the feeding of the part 1 to the movable electrode 24 of a projection welding machine, said electrode 24 being formed with a hole 25 for receiving the stem portion 2, with a magnet 26 fitted in the innermost region of said receiving hole for preventing of the part from falling out. A fixed electrode 27 is paired with the movable electrode 24 and has a steel plate part 28 mounted thereon. A shield member 29 is provided for preventing the position of the part 1 from being disturbed by a magnetic field produced around the movable electrode 24 when electric current is passed through the movable electrode 24 as the latter is lowered. As is clear from FIGS. 1, 3 and 5, the shield member 29 is a plate-like iron member joined to the piston rod 31 of an air cylinder 30 so that it is moved back and forth. The shield member 29 is movably positioned at the side to which parts and the feed rod are advanced, closing the notch 23 and covering the front end of the feed rod 10. In addition, the air cylinder 30 is fixed to a bracket 32 welded to the parts feeding tube 8 and guide tube 9.

The operation will now be described. Parts are fed one by one from the parts feeder 5. In FIGS. 1 and 3, the control rod 18 crosses the feed passage 6 and carries a part 1, while the shield member 29 is in the shielding state or the standby state, as shown in phantom lines in FIG. 3 or in solid lines in FIG. 5. When the control rod 18 is retracted, the part 1 falls as it is attracted by the magnet 15 until it stops at a position shown in phantom lines in FIGS. 1 and 3. The part is held at the front end of the feed rod 10, or the end of the feed passage 6. The control rod 18 is instantly returned to the crossing position, and the next part is fed onto the control rod 18. After the shield member 29 has been retracted, the feed rod 10 is moved to the phantom line position in FIG. 1, where the stem portion 2 of the part is coaxial with the movable electrode 24. Then, the movable electrode 24 comes down until the stem portion 2 enters the receiving hole 25. When the feed rod 10 is retracted concurrently therewith, the projections 4 slide on the protective plate 16, with the flange 3 moving out of the recess 13. The stem portion 2 is attracted by the magnet 26; thus, it is held by the movable electrode 24. The movable electrode 24 is then lowered to press the projections 4 against the steel plate part 28 and electrically energized to melt the projections 4, thus completing welding to the steel plate part 28. The movable electrode 24 is retracted to its original position, leaving the part 1 behind. When welding current is being passed through the movable electrode 24, the shield member 29 is closed to prevent the next part from being withdrawn by the magnetic force produced during passage of electric current or the sputter produced during welding from entering the slide clearance for the feed rod 10.

To obtain the operating sequence described above, the supply of air to the respective air cylinders may be effected by electrically operated control valves. Since this can be easily performed by the usual sequence control, a detailed description thereof is omitted.

An embodiment shown in FIGS. 6 and 7 will now be described. In this case, the invention is applied to stud welding. The part 1 is a stud bolt comprising a stem portion 2, a flange 3 and a projection 4 for welding, as in the preceding embodiment. The feed passage 6, parts feeding tube 8, control rod 18, air cylinder 20 and bracket 21 are exactly the same as in the preceding embodiment. The parts feeding tube 8 is connected to an operating tube 33 to communicate therewith, and a mechanism 34 for elastically holding a part is installed at the front end of the operating tube 33, said mechanism serving as the parts feeding means. More particularly, referring to FIG. 7, an elastic collet 35 forming said mechanism 35 is joined to the operating tube 33. The elastic collet 35 has three or four elastic legs 37 extending from an annular base 36. The legs 37 extend to the front end, with the spacing gradually decreasing. In addition, the mating steel part and the construction for shield gas are omitted from illustration. Further, the control rod 18 is installed relatively close to the elastic collet 35, as shown in FIG. 6.

The operation of this embodiment will now be described. The on-off control based on the controlled passage of parts effected by the control rod 18 is the same as in the preceding embodiment. The part 1 falling from the control rod 18 moves with its flange 3 pushing the elastic legs 37 apart. As soon as the flange 3 passes through the elastic legs 37, the latter clamp the stem portion 2, thereby completing the holding as shown in FIG. 7. Thereafter, the operating tube 33 is lowered in its entirety to effect stud welding to the steel plate part.

According to the present invention, since a part is once stopped at a position short of the parts holding means, the kinetic energy of the part acting on the parts holding means can be minimized or made constant at a predetermined value; therefore, there is no danger of a dent being formed in the parts holding means, and the elastic holding of a part as in the case of stud welding can be reliably effected. And even if the distance from the parts feeder to the parts holding means is as long as 10 m, the part can be fed to the intended place in a short time in that the part is once kept waiting at the place where it is once stopped. This is effective for increasing productivity.

What is claimed is:

1. A parts feeding device comprising:
   a tube for delivering parts to a delivery point;
   means located in the tube for temporarily arresting motion of a part, during a normal feeding cycle, at a preselected point in the tube upstream of the delivery point,
   a feed rod having an end adjacent the delivery point;
   a recess formed in the end of the rod for receiving a part therein;
   a first magnet located in the rod end for magnetically retaining the part within the recess;
   means for displacing the rod, bearing the part, to a second position whereat the part is located at a pickup point; and
   means for picking up the part and moving it to a further location.

2. The device set forth in claim 1 wherein the means for picking up the part has electrical current applied thereto thereby rendering the part pick up means an electrode for welding a picked up part; and
   an electromagnetic shield deployed adjacent the delivery point, at a time of applied current, to minimize the electromagnetic force imposed upon a part present at the delivery point.

3. The device set forth in claim 1 together with a second magnet mounted within an opening in the part picking up means for retaining the part therein during movement of the part to a further location.

* * * * *

UNITED STATES PATENT AND TRADEMARK OFFICE
CERTIFICATE OF CORRECTION

PATENT NO. : 5,233,151

DATED : August 3, 1993

INVENTOR(S) : Yoshitake Aoyama

It is certified that error appears in the above-identified patent and that said Letters Patent is hereby corrected as shown below:

Column 1, line 52, delete "as claimed in" and insert --,--;

Column 1, line 64, change "," to --;--.

Signed and Sealed this

Fifth Day of April, 1994

*Attest:*

BRUCE LEHMAN

*Attesting Officer*     *Commissioner of Patents and Trademarks*